Oct. 4, 1966                T. P. VAUGHN                3,276,130
                         LIQUID LEVEL GAUGE
Filed Aug. 5, 1964                                 3 Sheets-Sheet 1

INVENTOR.
T. P. VAUGHN
BY
ATTORNEYS

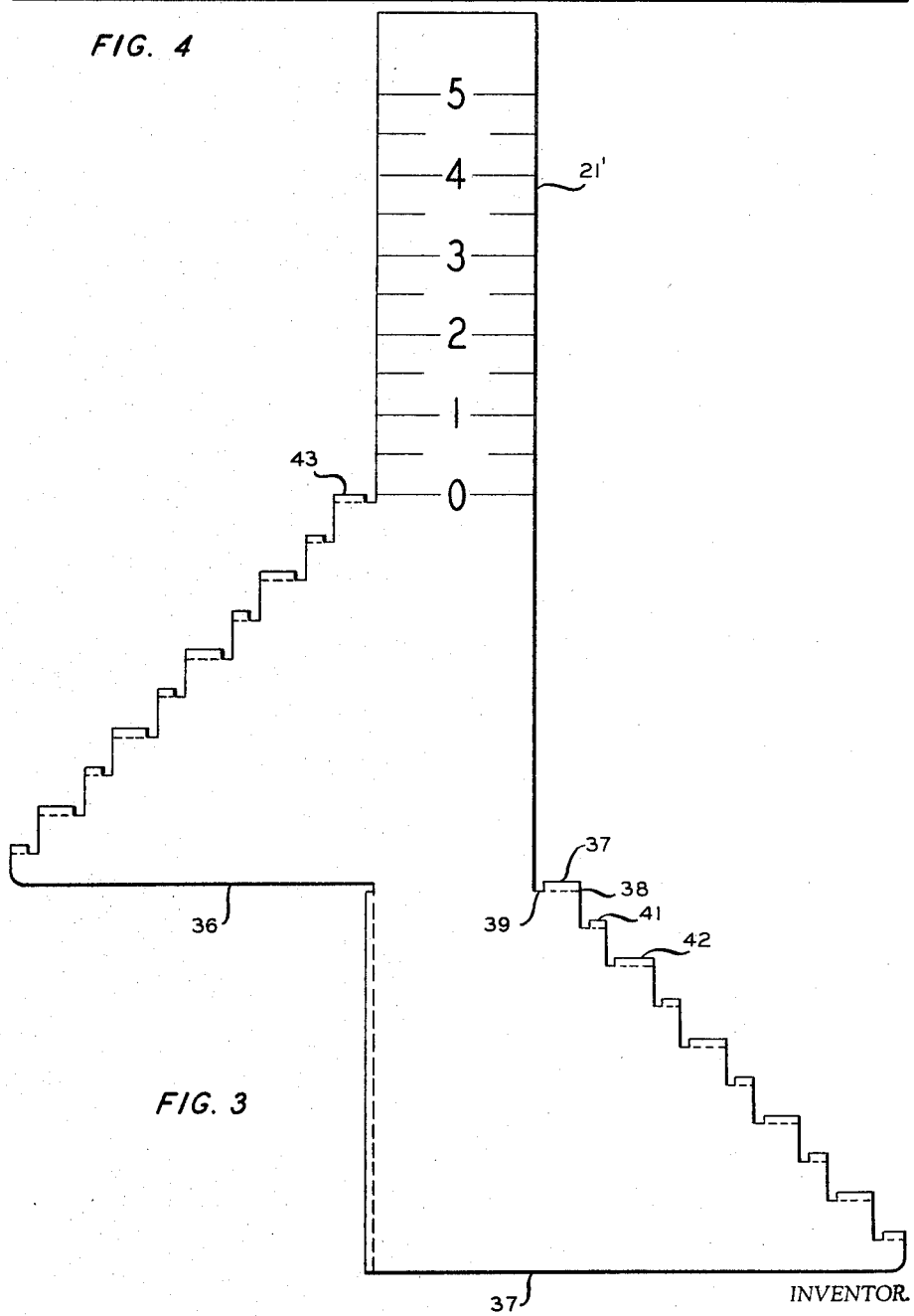

INVENTOR.
T. P. VAUGHN

United States Patent Office 3,276,130
Patented Oct. 4, 1966

3,276,130
LIQUID LEVEL GAUGE
Tony P. Vaughn, Phillips, Tex., assignor to Phillips Petroleum Company, a corporation of Delaware
Filed Aug. 5, 1964, Ser. No. 387,570
7 Claims. (Cl. 33—126.7)

This invention relates to a liquid level gauge. In one aspect this invention relates to a liquid level gauge which is particularly adapted to be employed in measuring the liquid level in top opening vessels.

The gauging of liquids in storage vessels has been accomplished in the past by a large number of different methods and devices. For example, the volume or depth of a liquid in a tank has been previously determined by means of floats, gauging lines or tapes provided with a plumb bob, pressure gauges responsive to the hydrostatic head of the liquid within the tank or vessel, or by the old-fashioned measuring stick which is inserted into the tank and then withdrawn for reading the height of liquid within the tank. None of these methods is completely satisfactory. The problem of gauging a liquid level in a tank is particularly acute with respect to tank cars. In the handling of many liquids in tank cars, e.g., volatile liquids such as various petroleum products, it is customary to not completely fill the tank, but to leave a vapor space in the top of the tank car. Interstate Commerce Commission regulations require that the modern so-called domeless tank cars shall not be filled with such liquids to the point where they are more than 98 percent shell full, i.e., an outage space of at least 2 percent of the shell capacity of the car must be left empty at the time the car is filled. Furthermore, under certain loading conditions such as in cold weather when the liquid being loaded is at an abnormally low temperature it is necessary to leave more than 2 percent outage when the car is filled. If this is not done and the car is filled under low temperature conditions, such as in the northern regions of the United States, and then shipped to a warmer climate, such as on the Gulf Coast, overflowing of the car will result when the liquid warms up in the warm climate. There is a natural tendency on the part of operators loading tank cars to overfill said cars so as to avoid complaints of short loading by the customer when the car arrives at its destination. This not only results in loss of product to the manufacturer, but also further aggravates the problem and/or danger of the car overflowing when the contents thereof warm up.

The present invention provides a gauging device which solves the above problems and/or difficulties. In accordance with the present invention it has been discovered that one of the most accurate methods of filling a tank car or other top opening vessel to a predetermined level is to have the fluid break over the top of a flat or horizontal surface as the level rises. Thus, broadly speaking, the gauging device of the present invention comprises a central vertically extending member having at least one side member extending outwardly therefrom at a position spaced below the top of said central member. Said side member is provided along the upper edge thereof with a series of horizontally disposed surfaces arranged stepwise with each succeeding surface in said series being spaced apart vertically a known distance from the immediately preceding surface in said series.

An object of this invention is to provide an improved gauging device. Another object of this invention is to provide an improved gauging device which is particularly adapted for measuring the liquid level in top openin adapted for measuring the liquid level in top opening vessels. Another object of this invention is to provide a gauging device which can be employed to accurately fill and measure the liquid level in a top opening vessel such as a tank car. Another object of this invention is to provide a gauging device which can be employed, in conjunction with a calibrated outage table for the tank in which the device is employed, to determine the amount of liquid in said tank. Another object of this invention is to provide a method of filling a tank car. Another object of this invention is to provide a method of fabricating a gauging device of the invention. Other aspects, objects, and advantages of the invention will be apparent to those skilled in the art in view of this disclosure.

Thus, according to the invention, there is provided a gauge for measuring the liquid contents of a top opening vessel, said gauge comprising: a vertically extending member; and a side member extending outwardly from said vertical member at a position spaced below the top thereof, said side member comprising a series of horizontally disposed steps arranged in a stair step manner with the horizontal surface of each succeeding step in said series being spaced apart vertically a known distance from the horizontal surface of the immediately preceding step in said series.

Further according to the invention, there are also provided a method for fabricating gauging devices of the invention and a method of employing said devices in the filling of top opening vessels, e.g., tank cars.

FIGURE 3 is a view in elevation of another embodiment of the gauging device of the invention.

FIGURE 4 is a plan view of the gauging device of FIGURE 3.

Figures 1, 2:
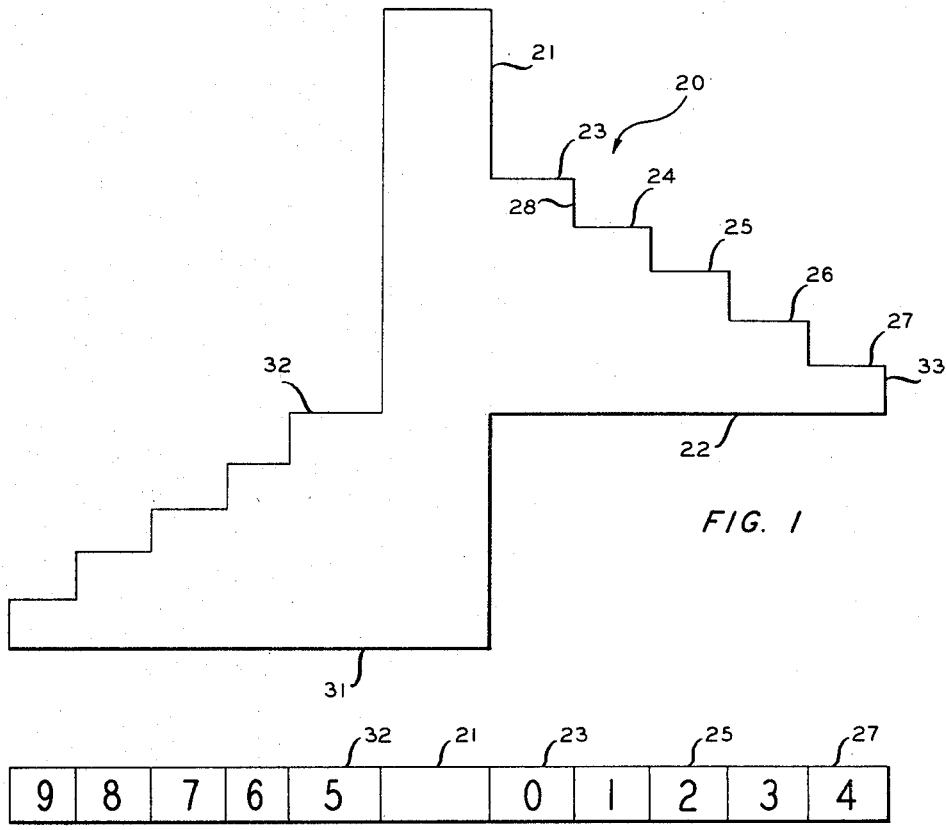
FIGURE 1 is a view in elevation of one embodiment of the gauging device of the invention.
FIGURE 2 is a plan view of the gauging device illustrated in FIGURE 1.

Referring now to the drawings, wherein like reference numerals have been employed to refer to like elements, the invention will be more fully described. Referring to FIGURE 1, the gauging device there generally designated by the the reference numeral 20 comprises a central vertically extending member 21. A side member 22 extends outwardly from said central vertical member at a position spaced below the top of said central member. Said side member is preferably formed integrally with and extends at a right angle from said central vertical member. However, said side member can be formed separately and then attached to said central member in any suitable manner, as by welding, bolting, etc. Said side member comprises a series of horizontally disposed steps 23, 24, 25, 26, and 27. Said steps are arranged in a stair step manner with the horizontal surface of each succeeding step in said series of steps being spaced apart vertically a known distance from the horizontal surface of the immediately preceding step in said series. Thus, the horizontal surfaces of succeeding step 24 is spaced apart vertically by the length of the riser 28 from the horizontal surface of immediately preceding step 23. Starting at the bottom of the stair step arrangement, the horizontal surface of succeeding step 26 is spaced apart vertically by the length of the riser 29 from the horizontal surface of immediately preceding step 27.

A gauging device fabricated with only one side member as described above can be employed in many instances with completely satisfactory results. However, it is frequently desirable that the gauging device of the invention be provided with more than one side member. In such instances this can be accomplished by extending the central vertical member 21 in a vertical direction for a distance sufficient to accommodate the added side members. Thus, as illustrated in FIGURE 1, a second side member 31 can be provided which extends outwardly from said central vertical member 21 at a position spaced apart from and below said first side member 22. It is usually preferred, but not essential, that the second side member extend outwardly from said central vertical member 21 at a position which is opposite as well as below the first side member. Said second side member 31 is comprised of a second series of horizontally disposed steps arranged in the same manner as said first side member 22. The horizontal surface of the uppermost step 32 of the series of steps comprising said second side member 31 is spaced apart vertically from and below the horizontal surface of the lowermost step 27 of the series of steps comprising said first side member 22. Said distance is represented by the length of riser 33 associated with said step 27 and is preferably said known distance referred to above.

As shown in FIGURE 2, the horizontal surface of each said step can be provided with index figures to indicate the depth of liquid (covering said surface) with respect to a known reference point. As explained further hereinafter, the reference point or zero mark is the horizontal surface of top step 23. Said index markings can be provided on said surfaces in any suitable manner as by etching, stamping, engraving, etc. Thus, said index markings can be either raised from or depressed in said horizontal surfaces. It is frequently desirable to coat or fill said index markings with a suitable paint, e.g., white or other color.

Referring now to FIGURE 3, the gauging device there illustrated likewise comprises a central vertical member 21'. In this embodiment of the invention said central member is provided with a plurality of graduated indicia on at least one surface thereof. Said indicia can be calibrated in any convenient manner, the most common form of calibration being in inches. The gauging device of FIGURE 3 is also illustrated as being provided with two side members 36 and 37 which are generally like the side members of the gauging device of FIGURE 1. As in the device illustrated in FIGURES 1 and 2, each step in each series of steps comprises a horizontally disposed surface, e.g., 37, and a connecting vertically disposed riser surface, e.g., 38. Each said series of steps is arranged in a stair step manner with the horizontally disposed surface of each said series of steps being spaced apart vertically a known distance from the horizontally disposed surface of the immediately preceding step.

However, the device of FIGURE 3 incorporates additional features which in many instances make it a preferred device over the device illustrated in FIGURES 1 and 2. For example, the horizontal surface, e.g., 37, of the uppermost step of each said series of steps has a notch 39 formed therein which separates said horizontal surface from the adjacent vertical edge of central member 21'. The horizontal surfaces, e.g., 41, 42, etc., of each succeeding lower step in each of said series of steps also has a notch therein which separates it from the adjacent vertical riser surface of the immediately preceding step, e.g., riser surface 38. Said notches, represented by notch 39, will fill from the side as the liquid level rises in the vessel being filled, and will thus give an early indication of when the liquid level is approaching the horizontal surface such as surface 37 at which the loading will be terminated. Said notch 39 and the other notches in the device can be of any desired depth. Said depth will usually be related to the size of the horizontal surface in which it is positioned and is preferably at least equal to the thickness of the material from which the gauging device is fabricated. However, depths up to as much as ½ inch or greater can be employed. Again, as in the device of FIGURES 1 and 2, the horizontal surface of the uppermost step of the series of steps comprising the second side member (the lower side member) is spaced apart vertically said known distance from and below the horizontal surface of the lowermost step of the series of steps comprising the first side member (the upper side member).

Another added feature which is incorporated in the device of FIGURE 3 is the provision of an intermediate step of smaller horizontal surface area between two steps of larger horizontal surface area. For example, see horizontal surface 41 which is smaller in area than horizontal surfaces 37 and 42. This feature also serves to provide for more accurate measurement of the liquid level in that it gives an early indication of when the liquid level is approaching one of the larger horizontal surfaces. Also, the alternate positioning of a small surface between two larger surfaces aids in locating and following the rising liquid level.

In describing the gauging device of FIGURES 1 and 3, reference has been made to a "known distance" with respect to the vertical spacing between the horizontal surfaces of the steps. This known distance is the riser length or height between the steps, e.g., riser 28 in FIGURE 1 and riser 38 in FIGURE 3. Preferably, in any given gauging device of the invention, this known distance or riser height will be the same for all steps. For example, in one embodiment of the invention fabricated in accordance with the embodiment lliustrated in FIGURE 1, said distance is commonly one inch. In another embodiment of the invention fabricated in accordance with the embodiment illustrated in FIGURE 3, said distance is commonly 0.5 inch. However, it is within the scope of the invention for different steps in the same device to be provided with a different riser height for devices which are to be employed in vessels having an irregular configuration.

The gauging devices of the invention can be fabricated in any convenient size, depending upon the tank in which they are to be employed. As an example only, in one embodiment of the invention which is commonly employed in top opening tank cars and which is fabricated in accordance with that illustrated in FIGURE 3, central member 21' has a front width of approximately 2 inches. The over-all length of the device is approximately 16.5 inches. The over-all horizontal length of each side member 36 and 37 is approximately 5 inches. The horizontal surfaces bearing the index figures 0–9 inclusive (see FIGURE 4) have a width of approximately ½ inch and a length of approximately ¾ inch. The depth of the notches 39 is the thickness of the 14 gauge hot rolled sheet steel (0.074″) from which the device is fabricated. It will be understood that the above dimensions are given by way of example only and any and all dimensions can be varied within the scope of the invention.

Figure 5:
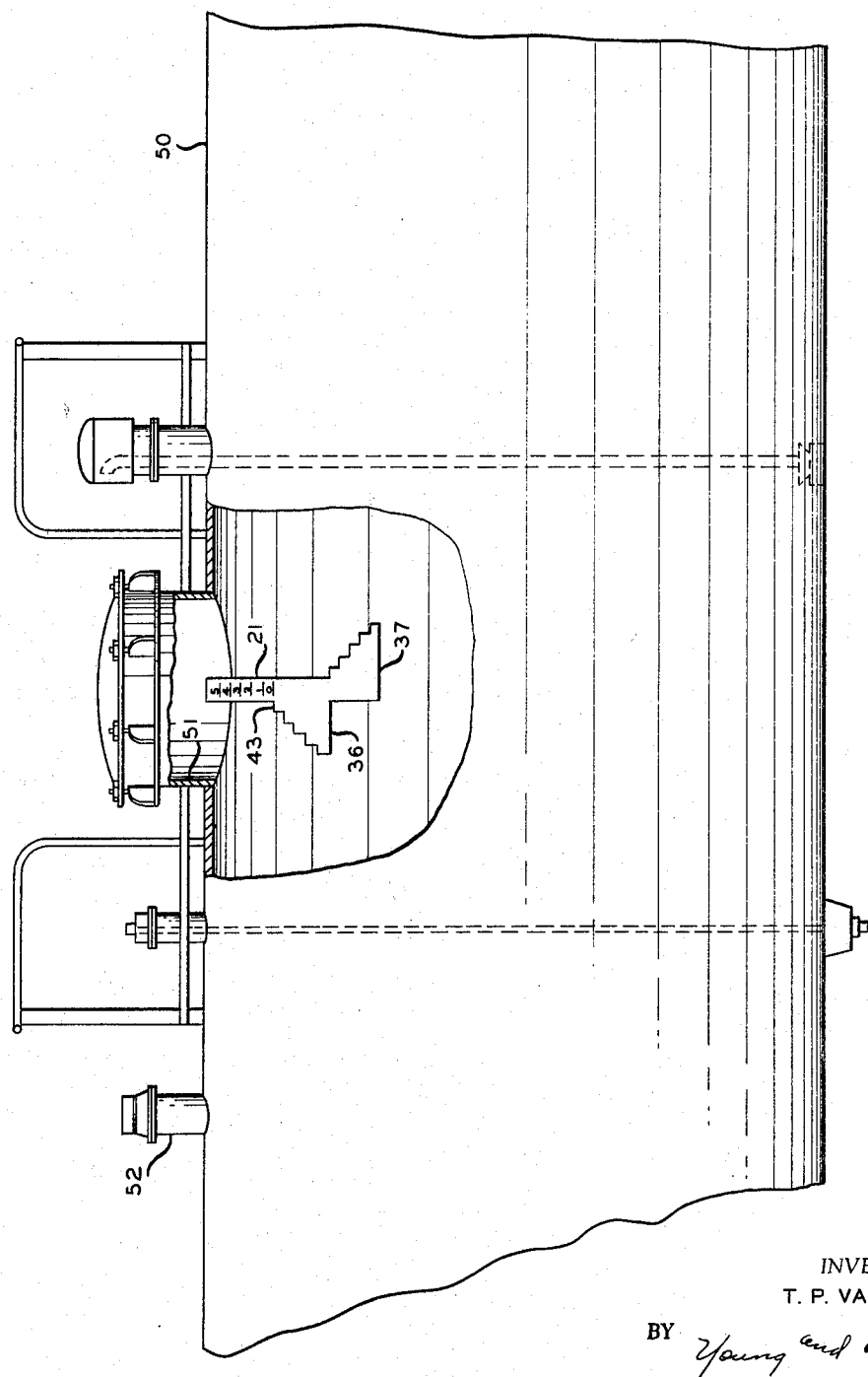
FIGURE 5 illustrates diagrammatically the installation of a gauging device of the invention in the manway of a modern domeless tank car.

The gauging device of the invention can be employed in practically any top opening vessel. However, said device is particularly adapted to be employed in top opening tank cars. The gauging device can be installed in the vessel in any suitable manner. When the device is installed in a top opening tank car, it can be conveniently installed by securing the upper end of central member 21 or 21' to the inner wall of the manway of the tank car, as by welding or in any other suitable manner. For example, referring to FIGURE 5, there is shown in diagrammatic form a typical modern domeless tank car 50 provided with a manway 51. Said tank car is also provided with the conventional fittings such as a safety valve 52 which can be set to release at a given pressure depending upon the material being shipped in the tank car and the materials from which said tank car is fabricated. A gauging device of the invention, generally in accordance with that illustrated in FIGURE 3, has been installed in said tank car. In such an installation the zero mark as shown on the face of central member 21 and also represented by horizontal surface 43 of the uppermost step of the first side member 36 is installed at a level which is equal to 2 percent outage in the shell of the car, i.e., the car will only be 98 percent full when filled to this level. As will be understood by those skilled in the art, there will be a variation in height to which the top of calibrated central member 21 extends up in manway 51, depending upon variations in the particular car. As shown in FIGURE 5, said central member 21 extends up into manway 51 about 2 inches. In tanks other than tank cars, the zero mark on central member 21 can be installed at any convenient or desired reference point.

As an example of the use of the gauging device of the invention, a conventional nominal 20,000-gallon tank car equipped with a gauging device in accordance with the invention is to be loaded with a commercial grade of normal pentane which has a typical specific gravity of 0.633 at 60° F. Said normal pentane is at a temperature within the range of 71–74° F. As previously mentioned, ICC regulations require that no tank car be loaded to an outage of less than 2 percent. Clearly, a material loaded at 71–74° F. is likely to increase in volume if the car is shipped to a warmer climate. Thus, provision must be made for this increase in volume at the time of loading. Another requirement in the loading of tank cars is that they shall not be more than shell full when the liquid therein has attained a temperature of 115° F. Thus, in the example here described, the tank car would be loaded to a point which is 3 inches below the 2 percent outage mark, i.e., the zero mark, on the gauging device of the invention. Then, by the use of calibrated outage tables the amount of liquid in the tank car can be accurately determined. As will be understood by those skilled in the art, at higher initial liquid temperatures the car could be filled to a higher mark on the gauging device but would never be filled above the zero or 2 percent outage mark.

The gauging device of the invention can be fabricated from any suitable material. Generally, said gauging device is fabricated from a suitable metal, depending upon the service in which it is to be placed. While some metals are preferred over other metals, fabrication of the device is not limited to any particular metal. For example, so-called gray iron or steel has been found more satisfactory than stainless steel, generally speaking, because it is easier to visually observe the liquid breaking over the horizontal surfaces of the gauge. Other materials such as plastics can be employed where service conditions demand or warrant.

The gauging device of the invention can be fabricated in any suitable manner. Referring to FIGURE 1, an obvious method of manufacturing the device there illustrated would be to simply saw the device from a suitable sheet or bar of metal or other material. Referring to the device of FIGURE 3, one presently preferred method for manufacturing same comprises: making a first cut a first predetermined distance to step 43 in a sheet of stiff material from one edge thereof; making a second cut in said material, parallel to and spaced apart from said first cut, a second predetermined distance (to step 37) greater than said first distance to thereby form central member 21. Next, make a first perpendicular (right angle) cut in said material from an edge adjacent said one edge to intersect said first cut at a point a given distance from the end thereof. The thus cut out portion of said material can then be removed. Next, make a second perpendicular (right angle) cut in said material from an edge opposite said adjacent edge to intersect said second cut said given distance from the end thereof. The thus cut out portion of said material can then be removed. A first series of additional cuts parallel to said first cut is then made in said material, each cut extending deeper into said material than the immediately preceding cut adjacent thereto by a distance equal to said given distance, and each cut being spaced apart from the immediately preceding cut adjacent thereto to form a first plurality of strips parallel to and on one side (e.g., left side) of said central member. A second series of additional cuts parallel to said second cut is then made in said material, each cut extending deeper into said material than the immediately preceding cut adjacent thereto by a distance equal to said given distance, and each cut being spaced apart from the immediately preceding cut adjacent thereto to form a second plurality of strips parallel to and on the opposite side (e.g., right side) of said central member. Each said strip in each of said pluralities of strips is then cut off at a distance above its base equal to said given distance to thereby convert each said strip into a tab. Each said tab is then bent to a position such that the resulting upper surface thereof is perpendicular (at a right angle) to said first and second cuts.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. A gauge for measuring the liquid level and amount of a body of liquid in a top opening vessel, said gauge comprising: a central vertically extending member; a first side member extending outwardly at substantially a right angle from said vertical member; a second side member extending outwardly from said vertical member at a position substantially opposite from and below said first side member; each of said side members comprising a vertically disposed surface and a series of horizontally disposed surfaces provided along the upper edge thereof and arranged stepwise with each succeeding surface in each said series spaced apart vertically a known distance from the immediately preceding surface in each said series; each of said horizontally disposed surfaces of each said side member comprising a tab extending horizontally from the vertically disposed surface of said side member; and the uppermost horizontal surface of the series of surfaces comprising said second side member being spaced apart vertically said known distance from and below the lowermost horizontal surface of the series of surfaces comprising said first side member.

2. A gauge according to claim 1 wherein each of said side members is formed integrally with said central member.

3. A gauge for measuring the liquid level in a top opening vessel, said gauge comprising: a central vertical member; a first side member formed integrally with and extending outwardly at substantially a right angle from said vertical member at a position spaced below the top thereof; a second side member formed integrally with and extending outwardly from said vertical member at a position substantially opposite from and below said first side member; each of said side members commprising a vertically disposed surface and a series of steps along the upper edge thereof; each step in each said series of steps comprising a horizontally disposed surface and a connecting vertically disposed riser surface arranged in a stairstep manner with the horizontally disposed surface of each succeeding step in said series of steps being spaced apart vertically a known distance from the horizontally disposed surface of the immediately preceding step in said series of steps; each of said horizontally disposed surfaces of each said side member comprising a tab extending horizontally from the vertically disposed surface of said side member; the horizontal surface of the uppermost step of the series of steps comprising said second side member being spaced apart vertically said known distance from and below the horizontal surface of the lowermost step of the series of steps comprising said first side member; the upper portion of said vertical member being provided with graduated indicia on at least one surface thereof; the lowermost of said indicia and the horizontal surface of the uppermost step of the series of steps comprising said first side member being positioned in the same horizontal plane.

4. A gauge according to claim 3 wherein the horizontal surface of the uppermost step of each said series of steps has a notch formed therein which separates it from the adjacent vertical edge of said central member, and the horizontal surface of each succeeding lower step in each of said series of steps has a notch formed therein which separates it from the adjacent vertical riser surface of the immediately preceding step.

5. A gauge according to claim 4 wherein the horizontal surface of the uppermost step and of each alternate step in downward progression in each said series of steps is larger in area than the horizontal surface of the other said steps.

6. A gauge according to claim 5 wherein each of said larger horizontal surfaces is provided with an integer index, said integer indexes being arranged in increasing magnitude from 0 on the horizontal surface of said uppermost step.

7. A gauge for measuring the liquid level in a top opening tank car provided with a manway mounted on the shell thereof, which car is not to be filled beyond a predetermined point in said shell adjacent the top thereof, said gauge comprising: a central vertical member; a first side member extending outwardly at substantially a right angle from said vertical member; a second side member extending outwardly from said vertical member at a position substantially opposite from and below said first side member; each of said side members comprising a vertically disposed surface and a series of horizontally disposed surfaces provided along the upper edge thereof and arranged stepwise with each succeeding surface in each said series spaced apart vertically a known distance from the immediately preceding surface in each said series; each of said horizontally disposed surfaces of each side member comprising a tap extending horizontally from the vertically disposed surface of said side member; and the uppermost horizontal surface of the series of surfaces comprising said second side member being spaced apart vertically said known distance from and below the lowermost horizontal surface of the series of surfaces comprising said first side member: said central member being adapted to be mounted in said manway and extend downward into said shell with the uppermost horizontal surface of said series of surfaces comprising said first side member positioned in the same horizontal plane as said predetermined point.

References Cited by the Examiner
UNITED STATES PATENTS

| | | | |
|---|---|---|---|
| 1,951,322 | 3/1934 | Bliss | 33—168 X |
| 2,027,145 | 1/1936 | Beebe | 33—126.7 X |
| 2,053,460 | 9/1936 | Brown | 33—126.7 |
| 2,536,401 | 1/1951 | Victor | 33—168 |
| 2,722,747 | 11/1955 | Fritz | 33—168 |
| 2,756,505 | 7/1956 | Zaleski | 33—104 X |

FOREIGN PATENTS

| | | |
|---|---|---|
| 337,426 | 5/1921 | Germany. |
| 821,197 | 9/1959 | Great Britain. |

LEONARD FORMAN, *Primary Examiner.*

ISAAC LISANN, *Examiner.*

W. D. MARTIN, *Assistant Examiner.*